United States Patent
Djugash

(10) Patent No.: US 9,031,779 B2
(45) Date of Patent: May 12, 2015

(54) SYSTEM AND METHOD FOR HAZARD DETECTION AND SHARING

(75) Inventor: Joseph Maria Angelo Djugash, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 188 days.

(21) Appl. No.: 13/484,070

(22) Filed: May 30, 2012

(65) Prior Publication Data

US 2013/0325325 A1 Dec. 5, 2013

(51) Int. Cl.
*G01C 21/34* (2006.01)
*G01C 21/36* (2006.01)

(52) U.S. Cl.
CPC ........ *G01C 21/3415* (2013.01); *G01C 21/3691* (2013.01); *G01C 21/3697* (2013.01)

(58) Field of Classification Search
CPC ........... G01C 21/3415; G01C 21/3461; G01C 21/3484; G01C 21/3492; G01C 21/3691
USPC ................................................. 701/423, 425
See application file for complete search history.

(56) References Cited

U.S. PATENT DOCUMENTS

| | | | | |
|---|---|---|---|---|
| 6,252,544 B1 * | 6/2001 | Hoffberg | ................ | 342/357.31 |
| 6,356,839 B1 * | 3/2002 | Monde et al. | ................ | 701/415 |
| 6,683,539 B2 * | 1/2004 | Trajkovic et al. | .......... | 340/932.2 |
| 6,732,077 B1 * | 5/2004 | Gilbert et al. | ................ | 704/270 |
| 6,865,480 B2 * | 3/2005 | Wong | ............................ | 701/431 |
| 7,099,773 B2 * | 8/2006 | Linn | ............................. | 701/414 |
| 7,161,504 B2 * | 1/2007 | Linn | ......................... | 340/995.13 |
| 7,343,268 B2 * | 3/2008 | Kishikawa | ........................ | 703/1 |
| 7,437,244 B2 | 10/2008 | Okada | | |
| 7,565,239 B2 * | 7/2009 | de Silva et al. | ............... | 701/426 |
| 7,571,029 B2 * | 8/2009 | Dai et al. | .......................... | 701/1 |
| 7,657,373 B2 * | 2/2010 | Kindo | ............................ | 701/413 |
| 7,693,654 B1 * | 4/2010 | Dietsch et al. | ................ | 701/461 |
| 7,729,850 B1 | 6/2010 | Kraft et al. | | |
| 7,791,503 B2 | 9/2010 | Breed et al. | | |
| 7,825,824 B2 * | 11/2010 | Shrum, Jr. | ..................... | 340/902 |

(Continued)

FOREIGN PATENT DOCUMENTS

| | | | | |
|---|---|---|---|---|
| JP | 08210865 A | * | 8/1996 | ............. G01C 21/00 |
| JP | 2005321323 A | * | 11/2005 | ............. G01C 21/00 |
| WO | WO 2011/071826 | | 6/2011 | |

OTHER PUBLICATIONS

NFB article, "GPS technology for the blind, a product evaluation", National Federation of the Blind, Feb. 2006, 12 pages, downloaded from https://nfb.org/images/nfb/publications/bm/bm06/bm0602/bm060206.htm.*

(Continued)

*Primary Examiner* — Behrang Badii
*Assistant Examiner* — David Testardi
(74) *Attorney, Agent, or Firm* — Snell & Wilmer LLP

(57) ABSTRACT

A system and method for a navigation system including a hazard avoidance feature is disclosed. The system and method allows for professionals, civilians, vehicles, robots and computer systems to collaborate and share information regarding hazards, defects, obstacles, flaws, and other abnormalities that exist in any environment. Routes may be planned that avoid these hazards reducing lost time or frustration. Moreover, the system and method is configured for participants to detect, catalog, and share information related to obstacles.

17 Claims, 4 Drawing Sheets

(56) References Cited

U.S. PATENT DOCUMENTS

| | | | |
|---|---|---|---|
| 7,912,627 B2 | 3/2011 | Downs et al. | |
| 8,024,330 B1* | 9/2011 | Franco et al. | 707/724 |
| 8,134,478 B2* | 3/2012 | Denaro | 340/905 |
| 8,155,865 B2* | 4/2012 | Bicego, Jr. | 701/117 |
| 8,354,942 B2* | 1/2013 | Stahlin | 340/901 |
| 8,406,998 B2* | 3/2013 | Shaffer et al. | 701/414 |
| 8,407,003 B2* | 3/2013 | Geelen et al. | 701/532 |
| 8,493,235 B2* | 7/2013 | Stahlin | 340/905 |
| 2004/0064251 A1 | 4/2004 | Miller et al. | |
| 2004/0107042 A1 | 6/2004 | Seick | |
| 2007/0096892 A1 | 5/2007 | Nathan et al. | |
| 2007/0150140 A1* | 6/2007 | Seymour | 701/35 |
| 2008/0033644 A1* | 2/2008 | Bannon | 701/210 |
| 2008/0059055 A1* | 3/2008 | Geelen et al. | 701/201 |
| 2008/0262670 A1 | 10/2008 | McClellan et al. | |
| 2009/0037093 A1* | 2/2009 | Kurihara et al. | 701/201 |
| 2009/0140887 A1* | 6/2009 | Breed et al. | 340/990 |
| 2009/0234859 A1 | 9/2009 | Grigsby et al. | |
| 2009/0248289 A1* | 10/2009 | Tanaka et al. | 701/200 |
| 2010/0235088 A1* | 9/2010 | Li et al. | 701/201 |
| 2010/0250106 A1 | 9/2010 | Bai et al. | |
| 2010/0332119 A1* | 12/2010 | Geelen et al. | 701/201 |
| 2011/0043377 A1 | 2/2011 | McGrath et al. | |
| 2011/0054689 A1 | 3/2011 | Nielsen et al. | |
| 2011/0084824 A1* | 4/2011 | Tewari et al. | 340/438 |
| 2011/0112720 A1 | 5/2011 | Keep et al. | |
| 2011/0153193 A1* | 6/2011 | Fox et al. | 701/201 |
| 2011/0224901 A1* | 9/2011 | Aben et al. | 701/208 |
| 2011/0307168 A1* | 12/2011 | Kieff | 701/200 |
| 2011/0313656 A1* | 12/2011 | Mignen et al. | 701/207 |
| 2012/0166074 A1* | 6/2012 | Weng et al. | 701/409 |
| 2012/0229302 A1* | 9/2012 | Sri-Jayantha | 340/905 |
| 2012/0270558 A1* | 10/2012 | Busch et al. | 455/456.1 |

OTHER PUBLICATIONS

DailyMail web page, "A road runs through it: resourceful engineers in crowded Japanese city buiild flyover via middle of an office block", Jan. 31, 2012, 5 pages, downloaded from http://www.dailymail.co.uk/news/article-2093903/No-room-road-Japanese-engineers-just-build-straight-middle.html.*

Jose Santo et al., "Sharing Context-Aware Road and Safety Information" PERVASIVE computing, IEEE CS 2009, pp. 58-65.

Jedrzej Rybicki et al., "Challenge: Peers on Wheels—A Road to New Traffic Information Systems", MobiCom2 2007, Sep. 9-14, 2007, Montreal, Quebec, Canada, 7 pages.

Simone Fuchs et al., "Context-Awareness and Collaborative Driving for Intelligent Vehicles and Smart Roads", University of Klagenfurt, Transportation Informatics, Department of Smart Systems Technologies, Klagen, Austria, 6 pages, (2007).

Subir Biswas et al., "Vehicle-to-Vehicle Wireless Communication Protocols for Enhancing Highway Traffic Safety", IEEE Communications Magazine, Jan. 2006, pp. 74-82.

* cited by examiner

SYSTEM AND METHOD FOR HAZARD DETECTION AND SHARING

BACKGROUND

1. Field

The present disclosure relates generally to improvements in documenting an environment and more particularly pertains to a system and method to automatically detect and catalog environmental hazards and/or obstacles for route planning.

2. Description of the Related Art

Robots have become widespread since the end of 1960s, but most have been manipulators or industrial robots, such as conveyor robots for the purpose of automated or unmanned production operations in factories. Recently, research and development has advanced on the structure and application of mobile robots. Thus, expectations on the practical use of such mobile robots have increased. Other than industrial uses, uses of recent robot apparatuses include living uses, i.e., "symbiosis" uses with human beings or "entertainment" uses. These robots, regardless of their function, are generally limited in ability by their programming and available sensors to react to the unexpected.

Computing power is ever advancing. The often quoted Moore's law, a rule of thumb in the history of computing hardware whereby the number of transistors that can be placed inexpensively on an integrated circuit doubles approximately every two years is likely currently outdated. Records of data may be made with more ease than was previously obtainable.

However, currently, no common system and repository exists where professionals, civilians, vehicles, robots and computer systems can collaborate and share information regarding hazards that exist in any environment. Any prior sharing of information was generally collected in a single fashion and was not real-time available to a multitude of users across various platforms. Thus, a more efficient and less costly system and method of obtaining data, housing and making use of the data is desired.

SUMMARY

The above disclosed needs are successfully met via the disclosed system and method. In view of the above-described problem, it is an object of the present disclosure to provide a navigation system. It is another object of the present disclosure to provide a system for proposing a route to a destination. The present disclosure is generally directed to a system and method where professionals, civilians, vehicles, robots and computer systems can collaborate and share information regarding hazards, defects, obstacles, flaws, and other abnormalities that exist in any environment. Routes may be planned that avoid these hazards reducing lost time or frustration. Moreover, the present system and method is configured for participants to passively detect information related to obstacles during routine operations.

In various exemplary embodiments, a computer-based method, a system, and an article of manufacture including a non-transitory, tangible computer readable storage medium having instructions stored thereon is disclosed. Specifically, a computer-based method, system, and an article of manufacture including a non-transitory, tangible computer readable storage medium having instructions stored thereon for receiving data associated with a hazard detected by a sensor is disclosed. This system further comprises updating a database with the data associated with the hazard and receiving a request for updated hazard information within a geographic boundary from a navigation device. In an embodiment, the navigation device may calculate a proposed route based on the destination and the updated hazard information. The proposed route may be filtered by the requestor based on a class of hazards desired to be avoided and/or hazards the user wished to receive a notification regarding. The hazard may be a geographic hazard and/or affect the time needed to reach the destination.

In some embodiments, the system may comprise notifying a responsible repair person of the hazard. The system may further comprise notifying a provider of the data associated with the hazard in response to the hazard being at least one of removed and investigated. The hazard may be, for instance, located in a building, on a path, in a park, and/or in a public space. Various aspects of the method and/or system may be provided by a mobile app. The sensor detecting the hazard may comprise an image sensor, a vibration sensor, a sound sensor, a proximity detector, a position detector, a force sensor, and/or a distance sensor.

In an exemplary embodiment, the hazard may not be associated with vehicle travel on a road. The system may further comprise modifying the data associated with the hazard in response to receiving data associated with the hazard from a repair person responsible for addressing the hazard. The system may further comprise verifying the identity of the user providing the data associated with the hazard. A navigation device may be configured to display the proposed route.

The system may further comprise transmitting updated hazard information to a navigation device in substantially real-time. In various embodiments, hazards may be selected for displaying to the user of the navigation device based on a user profile. A sensor may be integral to a vehicle, a robot, a drone, a computer, a mobile device, a navigation device, or a stand alone unit. In various embodiments, the data associated with the hazard detected by the sensor may be received from a robot. Data associated with the hazard may be validated by a trusted source prior to being populated on a proposed route. Moreover, the data associated with the hazard detected by the sensor may be collected passively.

BRIEF DESCRIPTION OF THE DRAWINGS

Other systems, methods, features, and advantages of the present disclosure will be or will become apparent to one with skill in the art upon examination of the following FIGS. and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the features of the present disclosure. In the drawings, like reference numerals designate like parts throughout the different views, wherein:

DETAILED DESCRIPTION

In general, planning a route involves many factors. A starting point and a destination are generally known a priori;

however, the route to arrive at the destination may not be known. The mode of travel is often times a factor for route planning. Also, route planning may benefit from increased knowledge regarding obstacles that may be encountered in transit. In an exemplary embodiment, aspects of the present system 100 may be used during real-time route planning. This can occur during travel to a destination or while en route and/or a combination thereof. For instance, a route which was previously planned may need to be automatically updated based on a newly identified obstacle/hazard.

In various embodiments, aspects of the present system 100 may be used for route planning. In various embodiments, aspects of the present system 100 may be used for autonomous vehicle and/or robotic route planning. In various embodiments, aspects of the present system 100 may be used for route planning for individuals, such as a disabled person. In various embodiments, aspects of the present system 100 may be used for removing and/or curing obstacles.

Figure 1:
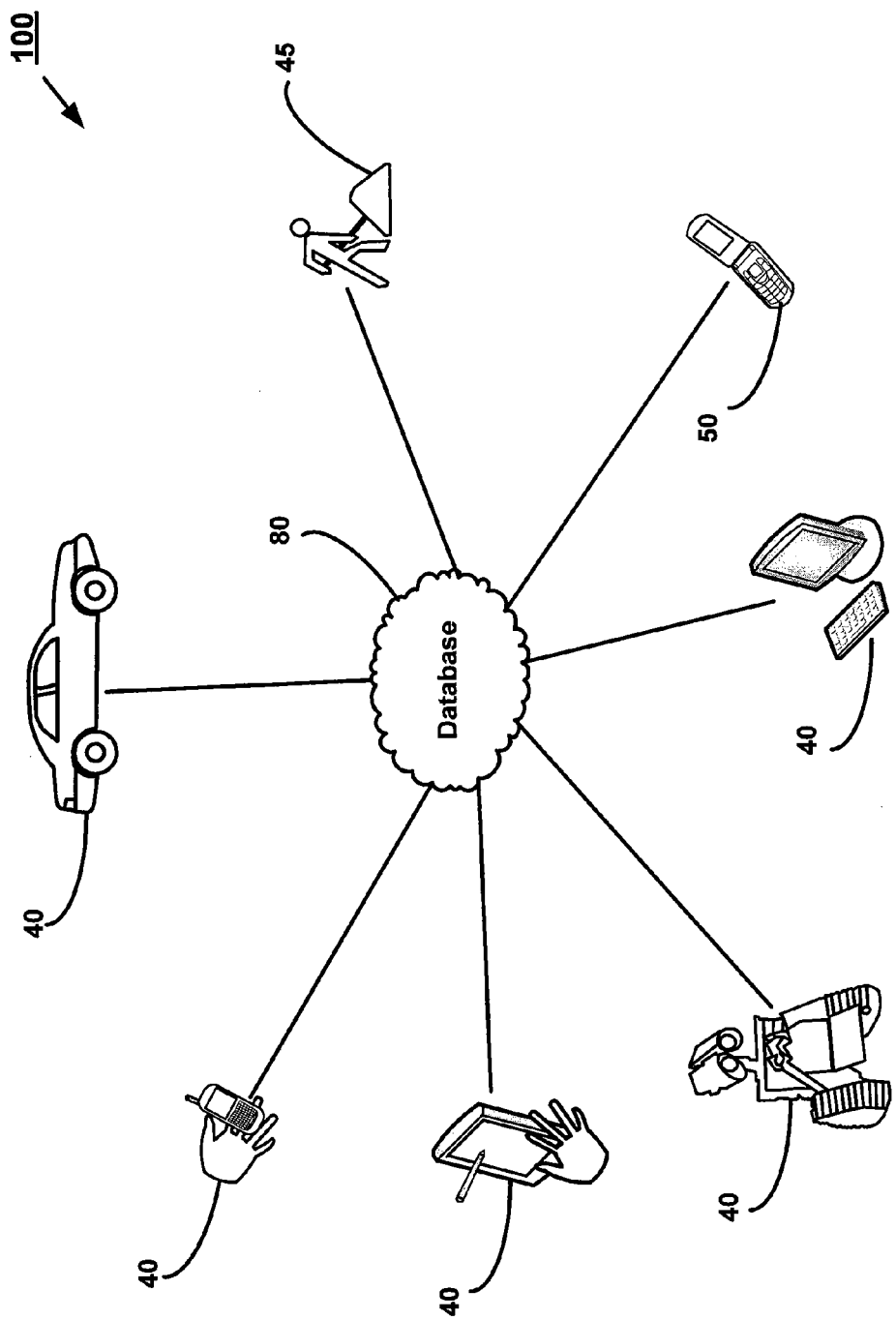
FIG. 1 depicts an exemplary embodiment of the system.

With reference to FIG. 1, the system 100 includes an optional navigation device 50, an information repository 80 in communication with the navigation device 50, and at least one participating detector 40 also in communication with the information repository 80. A participating detector 40 may be actively or passively participating in the system 100.

Figure 2:
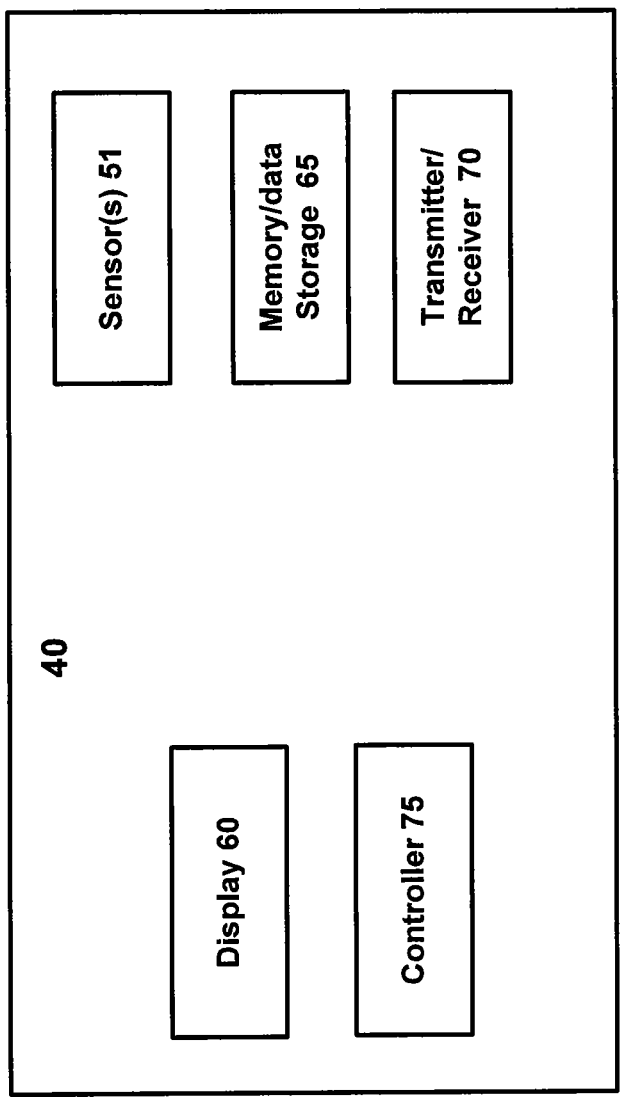
FIG. 2 depicts a block diagram of a detector device according to an exemplary embodiment.

With reference to FIG. 2 according to various embodiments, the detector 40 may comprise sensors 51, a display 60, data storage 65, a data transmitter/receiver 70, and a controller 75. Various sensors 51 may be used to capture data relating to the environment and obstacles encountered within the environment. A sensor 51 is a converter that measures a physical quantity and converts it into a signal which can be read by an observer or by an instrument. These sensors 51 may be any type of sensor 51 and/or a plurality of sensors 51 working in concert together.

These sensors 51 may include, an image sensor, such as a camera (picture and/or video), vibration sensor, sound sensor, proximity/position detector, force sensor, distance sensor and/or the like. Various sensors 51 may have varied sensing factors. For instance, these factors may include accuracy, e.g., the statistical variance about the exact reading; calibration constraints; cost; environmental such as temperature and/or humidity limits; range, e.g., limits of measurement or the sensor; repeatability, such as the variance in a sensor's reading when a single condition is repeatedly measured; and resolution, e.g., the smallest increment the sensor can detect with accuracy.

The position sensor may include a gyroscope, compass, a distance sensor, geomagnetic sensor, a global positioning system (GPS) receiver and/or the like. The detector 40 may be configured to detect the position of the detector 40, such as by using a position detector, within an established tolerance and link that position with an observation, such as an image being captured or measurements being made. Thus, the detector 40 may record the position of the detector 40, the hazard, another noteworthy position and/or a combination thereof. The proximity/position sensor may be capacitive; a capacitive displacement sensor; a passive thermal infrared; photocell (reflective); IR, laser, radar; reflection of ionizing radiation; sonar (typically active or passive) and/or the like.

The detector 40 may be configured to receive data input, such as a free text submission to comprise and/or append an entry and be in communication with the information repository 80. For instance, in an exemplary embodiment, the detector 40 may comprise a camera function and record images of an observed hazard and/or condition. (Described in greater detail below.)

In various embodiments, the detector 40 may be a stand alone sensing device in communication with a device configured to communicate with the information repository 80. In various embodiments, the detector 40 may be configured to communicate with the information repository 80 via a network. In various embodiments, the detector 40 is a specifically configured device to interact with the system 100; however, in various embodiments, the detector 40 is a computing device and/or enabled machinery. The detector 40 may be integral to a vehicle, robot, drone, computer, mobile device such as mobile phone or table computer, navigation device, or a stand alone unit. In various embodiments, the detector 40 may be a navigation device 50.

In various embodiments, data supplied to the information repository 80 may be data captured by sensors coupled to and/or integral to a vehicle, robot, drone, computer, mobile device such as mobile phone or table computer, navigation device, or a stand alone unit. For instance, in an embodiment a detector 40 may be a smart phone running a program or application.

In various embodiments, detectors 40 working in concert may supply data to the information repository 80. This data may be honed based on the type, accuracy and resolution of the sensors used in capturing the data.

A detector 40 may be used to record data pertaining to a hazard. For instance, a detector 40 may append information to the data pertaining to the hazard, such as recording a position and/or coordinates of the hazard. As used herein, the term "hazard" includes any hazard, defect, obstacle, flaw, and other abnormalities that exist in any environment. For example, a hazard may comprise a handrail that is not properly secured to a building or support. A hazard may comprise a weed growing up through a crack in the sidewalk. A hazard may comprise traffic, such as traffic caused by an accident on a road. A hazard may comprise a steep incline. A hazard may comprise road construction. A hazard may comprise a leaking pipe which creates a puddle. A hazard may be an impediment to rate of travel, an impediment to safety, a nuisance, and/or a strain on travel. A hazard may comprise a pothole in the sidewalk. A hazard may include a wet floor due to a spill. A hazard may comprise steps. A hazard may comprise a low hanging branch on a path. A hazard may comprise a narrow hallway. A hazard may comprise a gravel road. A hazard may comprise a bumpy road or path. A hazard may comprise a detour, such as a detour due to construction. A hazard may comprise a need for a path repair. A hazard may comprise construction worker noise. In various embodiments, a hazard may comprise a weather warning, an air quality warning, a health alert warning, an amber alert, and/or a security warning. The preceding is a non-exhaustive list of exemplary hazards. Unlike traditional navigation systems, the present system 100 is not limited to road based transit. The present system 100 may be used to plan routes and avoid hazards in buildings, on paths, on roads, through parks, in shopping malls, public spaces, and the like.

Figure 3:
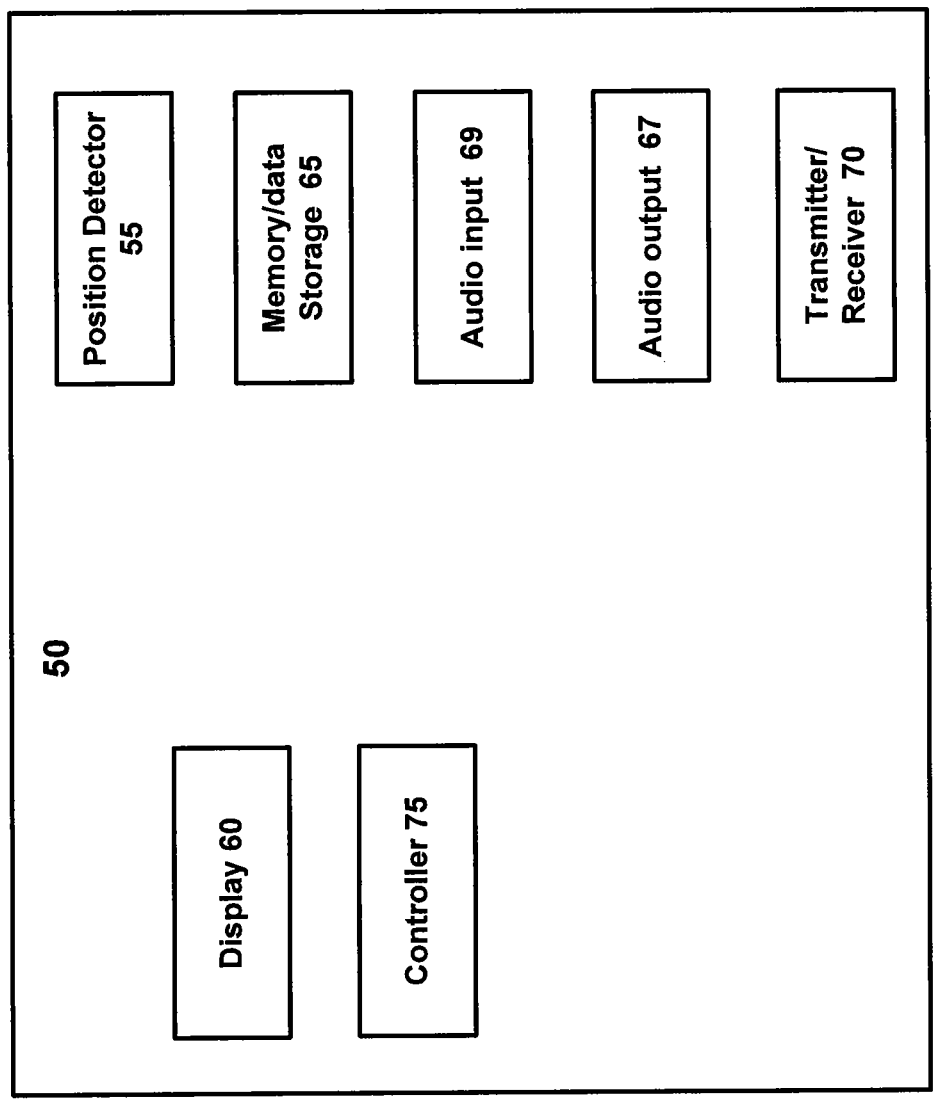
FIG. 3 depicts a block diagram of a navigation device according to an exemplary embodiment.

With reference to FIG. 3 according to various embodiments, the navigation device 50 may include a position detector 55, a display 60, data storage 65, an optional audio output unit 67, an audio input unit 69, a data transmitter/receiver 70, and a controller 75. The navigation device 50 may include various position sensors. These may include a gyroscope, a distance sensor, a geomagnetic sensor, and a global positioning system (i.e., GPS) receiver. The navigation device 50 may be configured to detect the current position of the navigation device 50 within an established tolerance. The navigation device 50 may be configured to provide turn-by-turn directions. The navigation device 50 may be configured to provide directions to points of interest, restaurants, modes of transit, shopping, recently found locations, home, etc. The navigation device 50 may also be configured to provide a user's current location and identify hazards in the vicinity and/or within a geographic range. In various embodiments, the navigation device 50 may be a detector 40.

The information repository 80 is a data storage device, such as a database and/or a non-transitory memory. The information repository 80 may be configured to store map data, map matching data, index data, chart information, blueprints, floor plans, seating charts, audio recognition dictionary data, and data in a transportation rule database. The information repository 80 may also be configured to store data defining a hazard, obstacle, defect, flaw, and other abnormality that may exist in any environment. This data may be uploaded to the information repository 80 over a network.

A user interface may be coupled to the information repository 80 for interacting with and accessing/modifying the data stored in the information repository 80. The user interface may include a touch switch or a touch panel formed on a screen of a display and/or mechanical push-button switches (not shown) disposed on the perimeter of the display. The user interface may include a number of methods available for modifying data such as, for example, free text entry using a keyboard or touch screen, selection of menu items, check boxes, option boxes, and the like. By manipulating the inputs of the user interface and/or utilizing the various methods available for modifying data, various application effects may be realized. For instance, instructions can be given to the controller to initiate a map scale change, menu display selection, destination designation, point of origin, route search, route guidance initiation, current position correction, display screen image change, volume adjustment, etc. Moreover, a user may give an operating signal to the navigation device 50 via a remote control (not shown) by operating a remote control (not shown) that has radio communication ability.

In an embodiment, the user interface is application software and/or a program running on a handheld device, such as a tablet or smart phone. Application software, also known as an application or an "app", is computer software designed to help the user to perform specific tasks. This application software may be a mobile application, also called mobile app, usually designed to run on smart phones and tablet computers; however, according to various embodiments, this mobile app may be run on any computer based system.

In an exemplary embodiment, in response to a destination being designated, the navigation device 50 autonomously searches for and/or calculates an optimal route from a current position detected by the position detector 55 to the destination, designates a guide route, and displays the guide route on the display. This guide route may be a route successfully previously used by a detector 40 vehicle, user, and/or unit. This guide route may be a route indicated as free of undesired hazards for the user of the navigation device 50.

The display may be, for example, a (color) liquid crystal display on which a map is displayed, and is designed so that map data such as road data, character data, and background data, a current position mark, landmarks, a guide route, and other appended data items can be displayed while being superposed or superimposed on one another. In this case, on a displayed map, other information such as a time to destination, time of arrival, time until arrival, current time, hazards, as well as a current position and a route (i.e., guide route) can be appended.

In various embodiments, the audio output unit 67 may comprise a speaker and/or audio port, and outputs audio, such as audio commands, which gives a guide to a destination or sub-destination along a proposed route, and/or various pieces of guidance, on the basis of data inputted from the information repository 80.

The audio input unit 69 may comprise a microphone and/or audio port, and inputs audio. In some embodiments, when the user utters voice, the user can operate aspects of the navigation device 50. Moreover, the user may use the audio input unit 69 and the audio output unit 67 to speak to an operator with access to the information repository 80 via the navigation device 50 and the transmitter/receiver 70. The navigation device 50 memory may comprise any type of memory, for example, ROM and/or RAM.

In an embodiment, the navigation device 50 and/or information repository 80 may include a map data acquisition unit, a route guidance unit, a map matching unit, a hazard tracking unit, a route calculation unit, and a route guidance unit. The navigation device 50 may acquire map data, such as updated map data and provide the map data to the route guidance unit to calculate a route. The map matching unit may use the current position of the navigation device 50, which is detected by the position detector 55, and map data, to identify and depict a current position of the navigation device 50. In this case, the map data acquisition unit acquires map data from the information repository 80.

The route calculation unit calculates or searches for a guide route and/or a proposed route to a destination on the basis of information on a current position calculated by the map matching unit, information on a point of departure designated by a user, and/or information on a destination which the user designates using the interface, and/or information regarding hazards that are desired to be avoided.

The route guidance unit calculates an optimal route in real-time using the result of the route calculation. In various embodiments, the depiction unit depicts an indicator of a current position, a depiction of the route, and a destination superimposed on a representation of a map of the route along with elements of the surrounding environment such as paths, points of interest, roads, hallways, parks, waterways, stairs, trails, elevators and the like. The route guidance unit may display the approximate time of arrival based on the navigation device's 50 current or suggested speed. The route guidance unit may update the optimal route calculation and result of the optimal route calculation and/or time of arrival if hazards that are desired to be avoided are removed and/or cured in real-time. Also, if a user deviates from the guide route by a predetermined amount the route guidance unit may update the optimal route calculation and result of the optimal route calculation and/or time of arrival to fit the user's current location.

Figure 4:
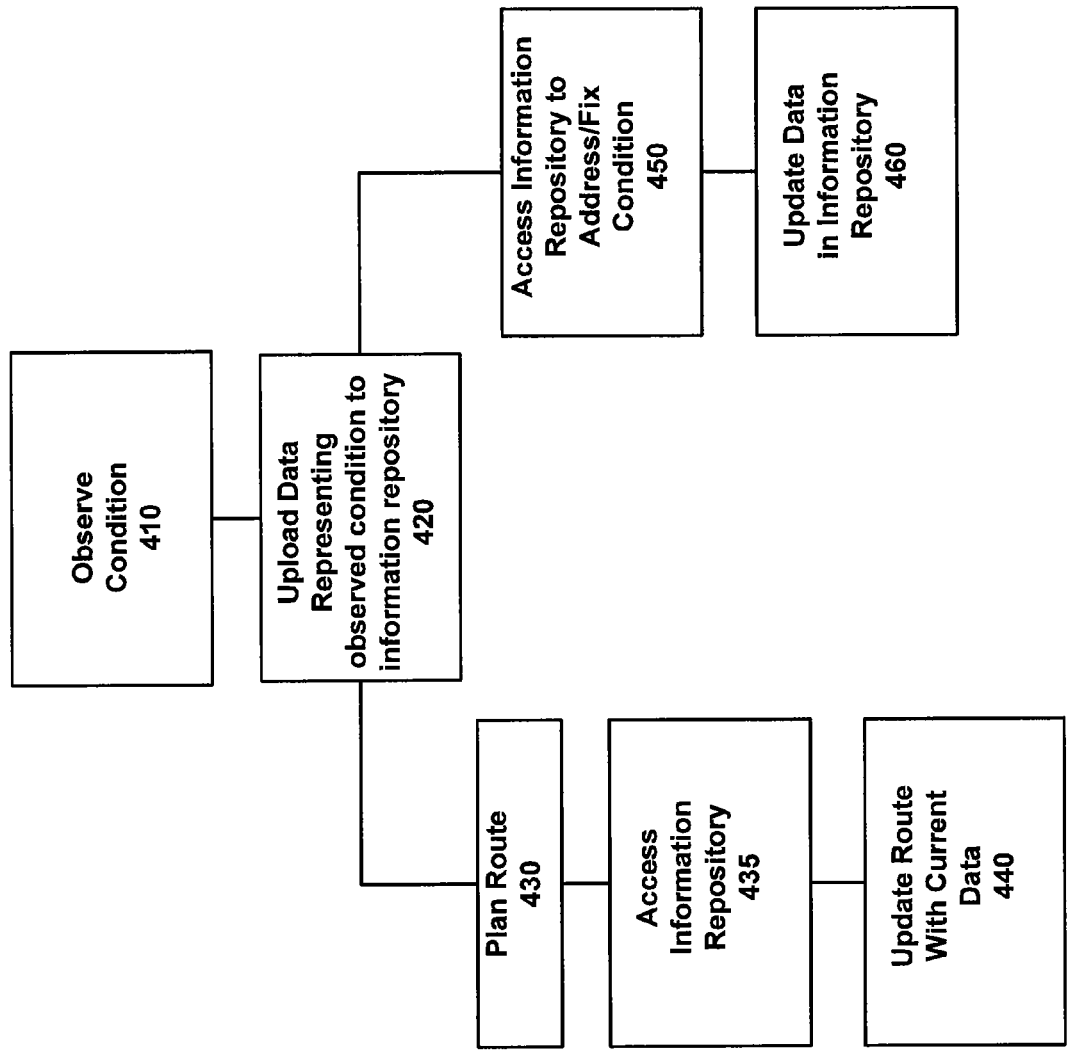
FIG. 4 illustrates a process flow of aspects of the system according to an exemplary embodiment.

In an exemplary embodiment and with reference to FIG. 4, in operation, a participating detector 40, such as a smart phone user who has downloaded an app associated with the system 100 may encounter a hazard, such as a low hanging branch on a path, while performing a task, such as a task unrelated to hazard identification (410). The smart phone user may open the app and take a photo of the hazard and create an entry associated with the hazard using the app. The user may add a description of the hazard, such as a free text entry of "low hanging branch" or a short audio description, "low hanging tree branch 4 feet from the ground." The user's location is recorded. The time of the hazard identification is appended to the entry. The type of sensor used to identify the hazard, (e.g., 5 megapixel camera) is appended to the entry. If possible, and the sensor does not automatically perform the measurement, additional information regarding the hazard may be requested of the user. For instance, this additional information may include a request to enter an approximation of the distance off of the ground of the lowest point of the low hanging branch. Optionally, a user id is appended to the entry. The entry is uploaded via a network to the information repository 80 (420). This upload may be substantially in real-time, such as at the time the entry is made and/or at some later time.

With renewed reference to FIG. 4, in response to the information repository 80 being updated with a new entry, the hazard tracking unit updates its data to include a designation of a low hanging branch. If the home owner's association (HOA) is a participating agent in the system 100, a message may be pushed to a repair worker 45, such as a home owner's association landscaper responsible for maintenance on that section of path (450). A repair worker 45 may also download a list of identified hazards within a geographic boundary at any time. In response to the repair worker 45 curing the hazard, the repair worker 45 may update/remove the entry pertaining to the repaired hazard (460).

An individual, such as a visually impaired and/or blind individual, requesting directions from their home to a park may access the system 100/information repository 80 via a navigation device 50, such as a smart phone with the app previously downloaded (430,435). The navigation device 50 may contact the information repository 80 via a network for an updated hazard listing (440). This user may filter the type of hazards they are concerned with. The user may select classes of hazards they wish to avoid and/or be notified. Alternatively, the user may select a class of hazards they do not wish to be notified. For instance, a minimum clearance of 6 ft may be selected from a drop down list and/or provided audio commands. In various embodiments, preferences for hazards that a user is interested in avoiding may be pre-saved to a user profile. In various embodiments, based on the filtering of hazards selected, a proposed route will not include the stretch of path containing the hazard until the hazard is removed from the system. Alternatively, if no suitable alternative exists a route with the hazard clearly indicated is provided.

In various embodiments, a class of hazards may be selected for the user based on characteristics of the user provided by the user. For instance, an operator/owner of an autonomous robot may select the width, height and mode of mobility, (e.g., wheel or track) of the robot. Based on these selections the hazards that may apply to the robot (e.g., stairs, narrow paths, height restrictions, etc.) may be populated to a proposed route for that robot (user).

In another embodiment a wheelchair bound user may select the wheelchair width and indicate that they use a wheelchair. Based on these selections the hazards that may apply to the wheelchair bound user (e.g., stairs, narrow paths, steep incline, etc.) may be populated to a proposed route for that user.

The maintenance worker/repair worker 45, e.g., landscaper, may inspect the hazard associated with the uploaded entry and ascertain if it needs to be addressed. If it does need to be addressed, when the hazard has been cured/repaired the maintenance worker has access to the system to remove/edit the hazard entry. In response to the hazard being removed the user who identified/uploaded the hazard entry may be sent an electronic message indicating that the hazard has been corrected. This feedback is an incentive to cure hazards quickly and motivates users to upload hazard information. The repair worker 45 may be a maintenance individual, government worker, such as a department of transportation worker, foreman, security, facilities personnel, and/or the like.

It may not be cost effective to repair all hazards nor will all hazards be repairable. For instance, loud construction noise may not be curable by a repair worker 45 but will subside in response to the construction being complete. This entry may be removed by a trusted user once the hazard has subsided.

In an exemplary embodiment, a participating detector 40 is allocated a security clearance prior to gaining access to the populate information to the information repository 80. This is may reduce the identification of hoax hazards. In various embodiments, a referral from a trusted participant may grant a participating detector 40 access to populate information to the information repository 80. In an exemplary embodiment, a user/owner of a participating detector 40 provides contact information, which may be verified and/or validated prior to gaining access to the populate information to the information repository 80.

In an exemplary embodiment, a first autonomous robot may be programmed to traverse a route. The robot may be configured to sense various attributes of the environment as the robot traverses the route. This robot may be an active or passive detector 40 of the system 100. The data regarding the successful traversing of the route, the characteristics of the route, (e.g., narrow hallway, lack of hazard detected, etc.) any modifications used to traverse the path, hazards encountered, may be uploaded to the information repository 80. This data may be used by subsequent robots for traversing the same or a portion of the same route. This may result in more efficient route traversal, as subsequent robot route traversals can use the most efficient path, eliminating any backtracking that was initially utilized by the first robot. Additionally, a second autonomous robot traversing a route which has previously been cataloged using the system may utilize fewer sensors based on the prior data gathered. This results in less expense needs for the subsequent robots.

In an exemplary embodiment, a vehicle, such as a car, may be operated in the normal course of transit. On board sensors 51 may capture data regarding hazards, such as steep grade, vibration, etc., during this operation. This data may be uploaded via a network to the information repository 80. This vehicle may be a passive collector of data.

In an exemplary embodiment, a hazard may not be populated to a proposed route and/or a navigation device 50 prior to being confirmed by a user of a second detector 40 and/or a trusted user of a second detector 40 having a prior history of verified identified actual hazards. This smaller population of trusted users may be notified of the suggested hazard for confirmation as they approach the geographic area of the hazard. The trusted user may investigate and validate the hazard to be populated to a proposed route and/or a navigation device 50. In various embodiments, this confirmation by the second detector is performed by the same type of sensor 51 or a sensor 51 with a higher degree of accuracy than the sensor 51 of the initial hazard contributor. The trusted user may investigate and validate the hazard to be populated to a proposed route and/or a navigation device 50.

In an exemplary embodiment, a detector 40, such as a robot equipped with sensors 51, may be requisitioned to catalog the attributes of an environment, such as a building, a road, a path, a park, and/or a public space. This equipped robot may detail the widths of corridors, the grade of a path, any clearance issues, smoothness of the path, any hazards encountered and/or the like. This data may be uploaded to the information repository 80, via a network, to generate a map, mark hazards, and assist with route planning.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., android, iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The system and method may be described herein in terms of functional block components, screen shots, optional selections and various processing steps. It should be appreciated that such functional blocks may be realized by any number of hardware and/or software components configured to perform the specified functions. For example, the system 100 may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system 100 may employ any number of conventional techniques for data transmission, signaling, data processing, network control, and the like.

As will be appreciated by one of ordinary skill in the art, the system 100 may be embodied as a customization of an existing system, an add-on product, upgraded software, a stand alone system, a distributed system, a method, a data processing system, a device for data processing, and/or a computer program product. Furthermore, the system 100 may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the system 100 have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method comprising the steps of:
    receiving, at a processor, first data defining a hazard sensed by a first sensor on a first device and confirmation data sensed by a second sensor on a second device, the second sensor having a greater accuracy than the first sensor and the confirmation data being used to confirm the hazard sensed by the first sensor;
    storing, in a memory, second data defining the hazard based on the confirmation data;
    receiving, at the processor:
        a selection of a class of hazards to be avoided, and
        a request for updated hazard information within a geographic boundary from a navigation device;
    determining, by the navigation device, a proposed route based on:
        a destination,
        the second data, and
        the class of hazards to be avoided; and
    displaying, on a display of the navigation device, the proposed route.

2. The computer-based method of claim 1, wherein the hazard is at least one of a geographic hazard, issue in need of repair, an impediment to rate of travel, an impediment to safety, a nuisance, a detour or a strain on travel.

3. The computer-lased method of claim 1, wherein the hazard affects the time needed to reach the destination.

4. The computer-based method of claim 1, further comprising transmitting to a provider, via a network device, the second data in response to the hazard being at least one of removed or investigated.

5. The computer-based method of claim 1, further comprising transmitting to a responsible repair person, via a network device, the second data.

6. The computer-based method of claim 1, wherein the hazard is at least one of located in a building, on a path, in a park, on a sidewalk, or in a shopping mall.

7. The computer-based method of claim 1, wherein aspects of the computer-based method are provided by a mobile app.

8. The computer-based method of claim 1, wherein the first sensor is at least one of an image sensor, a vibration sensor, a sound sensor, a proximity detector, a position detector, a force sensor, a distance sensor, a laser scanner or a radar sensor.

9. The computer-based method of claim 1, wherein at least a portion of the proposed route includes at least a portion of a path, a road, a hallway, a park, a waterway, a staircase, a trail or an elevator.

10. The computer-based method of claim 1, further comprising:
   receiving, at the processor, repair data associated with the hazard from a repair person responsible for the hazard's repair; and
   modifying, in the memory, the second data based on the repair data.

11. The computer-based method of claim 1, further comprising verifying, by the processor, the identity of a user of the first device.

12. The computer-based method of claim 1, wherein the navigation device is configured to display the proposed route on a display.

13. The computer-based method of claim 1, further comprising transmitting, via a network device, the second data to the navigation device in substantially real-time.

14. The computer-based method of claim 1, wherein the class of hazards are selected based on a user profile.

15. The computer-based method of claim 1, wherein the second data is detected by a passive sensor.

16. A system comprising:
   a processor configured to identify hazards,
   a tangible, non-transitory memory configured to communicate with the processor,
   the tangible, non-transitory memory having instructions stored thereon that, in response to execution by the processor, cause the processor to perform operations comprising;
      receiving, by the processor, first data defining a hazard sensed by a first sensor on a first device and confirmation data sensed by a second sensor on a second device, the second sensor having a greater accuracy than the first sensor and the confirmation data being used to confirm the hazard sensed by the first sensor;
      storing, in a memory, second data defining the hazard based on the confirmation data;
      receiving, by the processor:
         a selection of a class of hazards to be avoided, and
         a request, from a navigation device, for updated hazard information within a geographic boundary;
      determining, by the navigation device, a proposed route based on:
         a destination,
         the second data, and
         the class of hazards to be avoided; and
      displaying, on a display of the navigation device, the proposed route.

17. An article of manufacture including a non-transitory, tangible computer readable storage medium having instructions stored thereon that, in response to execution by a computer-based system configured to identify hazards, cause the computer-based system to perform operations comprising:
   receiving, by the computer-based system, first data defining a hazard sensed by a first sensor on a first device and confirmation data sensed by a second sensor on a second device, the second sensor having a greater accuracy than the first sensor and the confirmation data being used to confirm the hazard sensed by the first sensor;
   storing, by the computer-based system, second data defining the hazard based on the confirmation data;
   receiving, by the computer-based system:
      a selection of a class of hazards to be avoided, and
      a request, from a navigation device, for updated hazard information within a geographic boundary;
   determining, by the navigation device, a proposed route based on:
      a destination,
      the second data, and
      the class of hazards to be avoided; and
   displaying, on a display of the navigation device, the proposed route.

* * * * *